William Naylor,
Steam Safety Valve.
No. 3727.
Reissued Nov. 9. 1869.
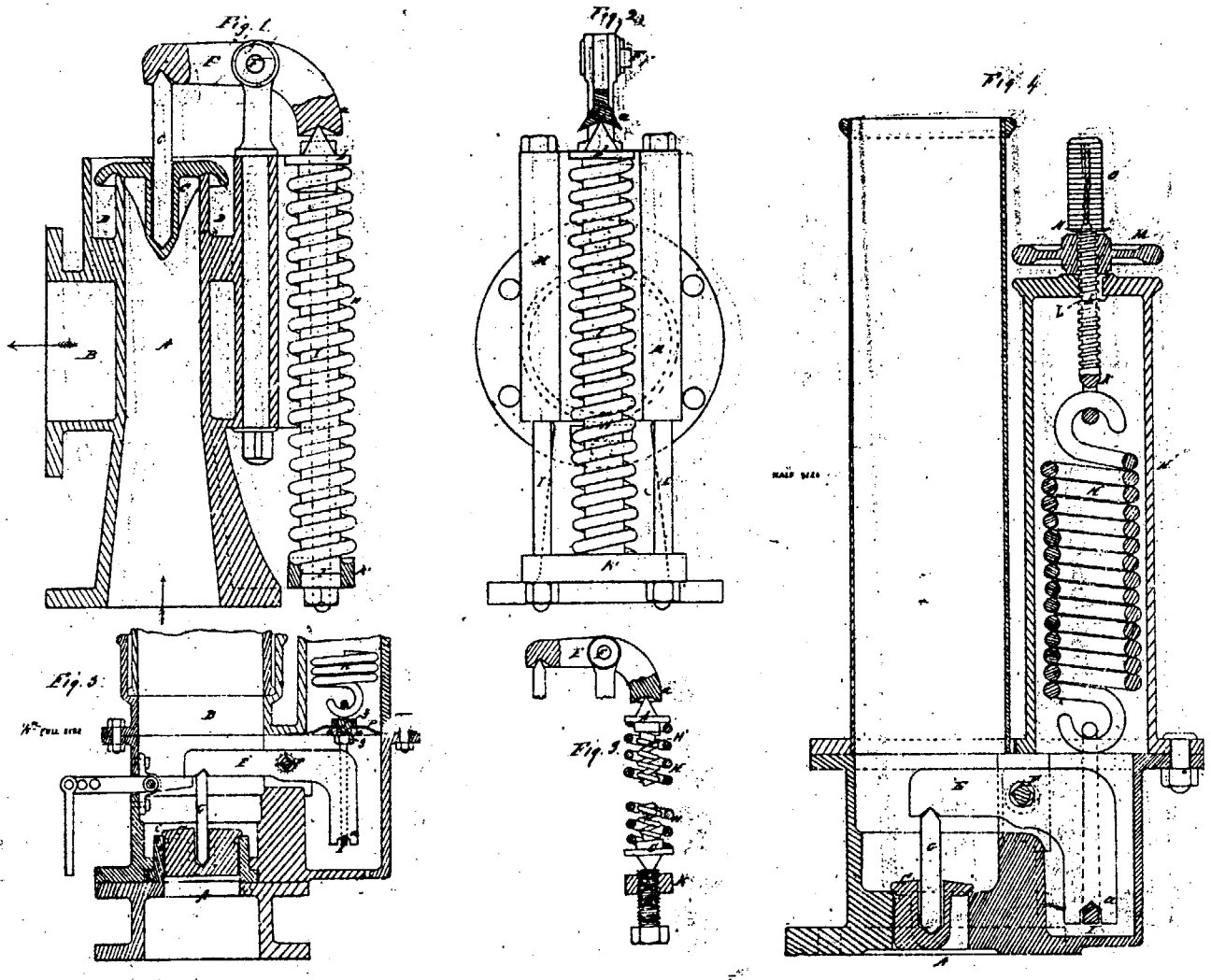
Witnesses
John Shuler
Inventor
Wm Naylor

UNITED STATES PATENT OFFICE.

E. H. ASHCROFT, OF BOSTON, MASS., ASSIGNEE OF WILLIAM NAYLOR.

IMPROVEMENT IN STEAM SAFETY-VALVES.

Specification forming part of Letters Patent No. 58,962, dated October 16, 1866; patented in England, January 21, 1864; Reissue No. 3,727, dated November 9, 1869.

*To all whom it may concern:*

Be it known that I, WILLIAM NAYLOR, of 57 Mildmay Park, in the county of Middlesex and Kingdom of Great Britain, have invented certain new and useful Improvements in Safety-Valves; and I hereby declare the following to be a free, clear, and exact description of the same, reference being had to the accompanying drawing.

This invention relates to spring safety-valves, and is applicable to locomotive-engine boilers and stationary and marine engine boilers.

The main object to be attained by this invention is the counteracting the additional load upon the valve as it is raised from its seat, produced by the increased resistance of the spring. This is accomplished by using a lever of the first order, one end resting, by a suitable pin, upon the safety-valve, constructed and arranged as hereinafter described, and the other end of the lever resting upon the spring; but in lieu of having this lever straight, or nearly so, I propose to bend downward that end which is acted upon by the spring to an angle of about forty-five degrees, so that when the valve is raised by the steam the other end of the lever is depressed upon or against the spring downward, and at the same time is moved inward toward the fulcrum, thus virtually shortening that end of the lever, and thereby counteracting the additional load upon the valve as it is raised from its seat by the greater amount of compression or tension, as the case may be, which is put upon the spring; and my invention also consists in the valve C, constructed with projecting downward-curved lip or periphery, and in the annular chamber D, surrounding the valve seat, whereby, as the spring is compressed by the lifting of the valve, the projecting lip of the valve and the annular recess are available in causing an increased pressure on the valve, and thus overcome the increased resistance of the spring, due to its compression, as hereinafter more fully set forth.

Figures 1 and 2 of the annexed sheet of drawings represent, respectively, a vertical section and front elevation of a safety-valve constructed according to my invention.

A is the main thoroughfare, leading directly from the boiler; B, a lateral branch or escape-passage for a portion of the steam after it has passed the valve C. I make this valve to project over the edges of the exit-passage A and to curve its projecting edges slightly downward, as shown in Fig. 1, so that the steam, on issuing between the valve and its seat, will impinge against the curved projecting portion of the valve, and a portion of it will be directed downward into the annular chamber D, surrounding the central passage A, and communicating with the exit-pipe B, while the other portion of the steam ascends past the edge of the valve.

E is my improved valve-lever, working on a fulcrum, F, and made to hold down the valve at one end, through the rod or spindle G, by the expansive force of the helical spring H, which exerts an upward pressure against the opposite end, *a*, of the lever. This end *a* of the lever is bent downward to an angle of about forty-five degress, and is acted upon directly by the upper end of a rod or spindle, I, situated inside the coils of the spring H, and provided with a flange or collar, *b*, against which the upper end of the spring bears, the lower end of the spring resting upon a cross-bar, K, through a hole in the center of which the lower end of the spindle I is guided and is free to move vertically.

If preferred, the rod or spindle I may be dispensed with, the upper end of the spring H being turned up to bear directly against the lever, while the lower end may either lie in a sunk bed in the cross-head or be turned down to form a contact or center bearing-point.

Fig. 3 is a detail, showing a slight modification of the mode of fitting or adapting the spring or springs H.

*a* is the bent end of the lever E. (Shown in Fig. 1.) *b* is a nipple or center point, which is pressed against the end *a* of the lever by one or more springs, H H′. The lower ends of these springs bear against a similar nipple or center point, *c*, which rests in a countersink in the cross-head K, or in the end of an adjusting-screw, *d*, passing through the cross-bar, so that by raising or lowering the screw the resistance of the spring or springs may be regulated.

L L, Fig. 2, are two long bolts passing through corresponding sockets M M, cast on the valve-casing, and through corresponding bolt-holes near each end of the cross-bar K, which is thus supported entirely by the two bolts.

By tightening more or less the bolts L, by their nuts, the spring H may be compressed to any desired extent between the cross-bar K and the collar or flange *b* on the spindle I.

The operation of the peculiar bent lever is as follows: So soon as the pressure in the boiler overcomes the resistance of the spring H, the valve is lifted, and a certain extra compression is put on the spring. The increasing compression of the spring during the opening of the valve has a tendency, if no compensating means are employed, to check the full opening of the valve, so as to afford an escape-orifice equal in area to that of the passage A; but, by bending down the lever, as shown at *a*, the lifting of the valve tends to draw that end of the lever toward the fulcrum, thereby virtually shortening that end of the lever. Consequently the power of the lever to compress the spring is increased in proportion as the valve is elevated, or, in other words, the resistance of the spring is proportionately diminished.

When the apparatus is properly constructed the resistance against the lifting of the valve will be uniform, or nearly so, in whatever position the valve may be.

Fig. 4 represents a vertical section of a two-inch locomotive-boiler safety-valve, wherein the spring operates by tension in lieu of by compression, as in the previous arrangement.

The same letters of reference indicate the corresponding parts of those shown in Figs. 1 and 2.

A is the main thoroughfare from the boiler. B is the exit-pipe for the escape-steam; C, the valve itself, which is held down by one end of the lever E, working on the fulcrum F, and bearing at one end upon a rod or spindle, G, while its opposite end is bent downward, as shown at *a*, and is connected, by the knife-edged link I, with the lower end of the helical spring H, to which the link is hooked. The upper end of this spring, which is inclosed in a tubular casing H′, is hooked into the adjustable eye R, carried by the lower end of the adjusting screw-spindle L, which passes through a central aperture in the top of the casing, and is prevented from rotating by a key, fitting a slotted keyway, extending longitudinally down one side of the screw-spindle.

M is a nut or hand-wheel working on the screw-spindle, by turning which the screw will be raised or lowered, and, consequently, more or less tension will be put upon the spring and a corresponding load applied to the valve-lever E. N is a circular knife-edged index screwed to the top of the screw-spindle; and O is the graduated scale attached to the nut or hand-wheel, for indicating the load upon the valve per square inch.

The valve, on being lifted, will elevate the corresponding end of the bent lever E, and depress the opposite or bent end, *a*, which will be more or less resisted by the contractile power of the spring H; but the end *a*, on being depressed, will at the same time be drawn toward the fulcrum, thereby virtually shortening that end of the lever and compensating for the increased resistance of the spring.

When the collar of K reaches the top of the casing no further load can be put on the valve, and thus any tampering with the valve is prevented.

Fig. 5 represents a vertical section of a portion of a five-inch safety-valve, adapted for large marine or land boilers, constructed according to this invention. It is similar in all essential details to the smaller arrangement illustrated at Fig. 4, and the corresponding parts are indicated by corresponding letters of reference.

In safety-valves for marine boilers I prefer, however, to close steam-tight the bottom of the casing containing the helical spring H, by means of a flexible diaphragm, P, of vulcanized india-rubber or other suitable material capable of withstanding the action of steam, whereby all access to the spring of salt-water thrown through the safety-valve when priming, and injurious effect thereof upon the metal, are prevented. This diaphragm is held at its circumference between the flanges of the spring-casing and the valve-casing, while its center is nipped between the annular end *e* of the link *i* and the shoulder *f*, which shoulder has a square or hexagonal center boss, *g*, formed thereon, and fitting a correspondingly-shaped aperture in the top of the link I.

*h* is nut working on a screw in the center of the boss *g*, and serving to nip the diaphragm between the parts *e f*.

The valve-casing is of cast-iron, and the valve and seat are of gun-metal.

Q is a small relieving-lever for easing the valve when requisite, its inner end projecting beneath the end of the safety-valve lever, as shown, while its outer end is connected by a rod for actuating the relieving-lever.

*Claims.*

I claim—

1. The combination and arrangement, with the hereinbefore-described safety-valve, of bent levers of the first order and the spring or springs, in the manner substantially as hereinbefore set forth.

2. The safety-valve C, with its overhanging downward-curved lip or periphery and annular recess D, substantially as herein shown and described, and for the purpose set forth.

3. The annular recess D surrounding the valve-seat, substantially as herein set forth.

4. The combination of the valve C and the annular recess D, as herein set forth, and for the purpose described.

WM. NAYLOR.

Witnesses:

EDWIN P. ALEXANDER,
THOS. I. BYRNE,
*47 Lincoln's Inn Fields.*